(12) United States Patent
Chuang

(10) Patent No.: US 10,343,738 B2
(45) Date of Patent: Jul. 9, 2019

(54) WATER BOTTLE HOLDER AND COMBINATION INCLUDING THE SAME AND WATER BOTTLE HOLDER ADAPTER

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 78 days.

(21) Appl. No.: 15/487,502

(22) Filed: Apr. 14, 2017

(65) Prior Publication Data

US 2018/0037286 A1    Feb. 8, 2018

(30) Foreign Application Priority Data

Aug. 3, 2016   (TW) .............................. 105124685 A

(51) Int. Cl.
  *B62J 9/00*    (2006.01)
  *B62J 1/00*    (2006.01)
  *B62J 11/00*   (2006.01)

(52) U.S. Cl.
  CPC ................ *B62J 9/006* (2013.01); *B62J 1/00* (2013.01); *B62J 11/00* (2013.01)

(58) Field of Classification Search
  CPC ................ B62J 9/00; B62J 1/00; B62J 11/00
  USPC ........................................................ 224/414
  See application file for complete search history.

(56) References Cited

U.S. PATENT DOCUMENTS 5,217,116 A * 6/1993 Ku ............................. B62J 9/02
                                                      206/374
8,028,876 B2 * 10/2011 Carpenter ................ B62J 11/00
                                                      224/413

2005/0156001 A1 * 7/2005 Dal Pra .................... B62J 11/00
                                                      224/414
2010/0072232 A1 * 3/2010 Rider ........................ A45F 3/16
                                                      222/610
2013/0126569 A1 * 5/2013 Huang ..................... B62J 11/00
                                                      224/414
2013/0270315 A1 * 10/2013 Tsai ........................ B62J 11/00
                                                      224/414
2013/0307246 A1 * 11/2013 Jankura .................... B62J 11/00
                                                      280/281.1

(Continued)

FOREIGN PATENT DOCUMENTS

| TW | M416588 U1 | 11/2011 |
| TW | M512531 U  | 11/2015 |
| TW | M516543 U  | 2/2016  |

*Primary Examiner* — Peter N Helvey
(74) *Attorney, Agent, or Firm* — Alan D. Kamrath; Mayer & Williams PC

(57) ABSTRACT

A combination includes a water bottle holder adapter and a water bottle holder. The water bottle holder adapter includes first and second engaging portions. The first engaging portion can engage with a bicycle seat. The water bottle holder includes first, second, and third extensions. The first extension is detachably connected to the second engaging portion of the water bottle holder adapter. The third extension extends transversely to the first extension and includes an abutment face on which a water bottle can rest. The first, second, and third extensions together define a receiving space receiving the water bottle and having an opening opposite to the abutment face. Each of the first and second extensions includes an end adjacent to the opening. A first spacing between the end of the first extension and the abutment face is smaller than a second spacing between the end of the second extension and the abutment face.

4 Claims, 5 Drawing Sheets

(56) References Cited

U.S. PATENT DOCUMENTS

2014/0263507 A1* 9/2014 Wang ...................... B62J 11/00
224/414

* cited by examiner

WATER BOTTLE HOLDER AND COMBINATION INCLUDING THE SAME AND WATER BOTTLE HOLDER ADAPTER

BACKGROUND OF THE INVENTION

The present invention relates to a water bottle holder and a combination including the water bottle holder and a water bottle holder adapter.

Taiwan Utility Model No. M512531 discloses an auxiliary assembly for fixing purposes. The auxiliary assembly includes a first casing and a second casing fixed to the first casing by a bolt. A fixing portion is located on at least one of the first casing and the second casing. An adjusting track portion is located between the first casing and the second casing. The auxiliary assembly further includes an adjusting end portion in the form of an arcuate plate, and two auxiliary portions are on two sides of the arcuate plate. The adjusting end portion is restricted to slide relative to the adjusting track portion. The auxiliary device is pivotably mounted to the adjusting track portion. The fixing portion can be connected to a bicycle seat. The two auxiliary portions can be connected to a water bottle holder. However, a typical water bottler holder available in the market includes a first section having two through-holes, a second section, and a receiving space defined between the first and second sections and having an opening. Two bolts extend through the two through-holes into the two auxiliary portions to connect the water bottle holder to the auxiliary portions. A water bottle can be placed into the receiving space via the opening. When a user is riding a bicycle equipped with the water bottle holder holding a water bottle, the water bottle is apt to fall from the water bottle holder due to an inclination angle between the water bottle and the seat.

Thus, a need exists for a novel water bottle holder that mitigates and/or obviates the above disadvantages.

BRIEF SUMMARY OF THE INVENTION

An objective of the present invention is to fix the problem of a water bottle received in a water bottle holder attached to a bicycle falling during cycling resulting from inclination of the water bottle relative to the bicycle seat.

In a first aspect, a water bottle holder includes a shelf having a first extension, a second extension, and a third extension. The first extension can be directly or indirectly coupled to a bicycle seat. The third extension extends transversely to the first extension and includes an abutment face. The first extension, the second extension, and the third extension together define a receiving space having an opening opposite to the abutment face. A water bottle can be placed into the receiving space via the opening and includes a bottom resting on the abutment face. Each of the first and second extensions includes an end adjacent to the opening. A first spacing between the end of the first extension and the abutment face is smaller than a second spacing between the end of the second extension and the abutment face.

In an example, the second extension includes a first section, a second section, and first and second hook sections. The first and second sections are located at two sides of the second extension and are spaced from each other by a spacing. The first hook section is disposed on an end of the first section remote to the abutment face. The second hook section is disposed on an end of the second section remote to the abutment face. The second extension further includes first and second top edges. The first top edge is located on an end of the first hook section remote to the first section. The second top edge is located on an end of the second hook section remote to the second section.

In an example, the shelf includes at least one first rib and at least one second rib. The third extension extends perpendicularly to the first extension. The at least one first rib is connected between the first extension and the first section of the second extension. The at least one second rib is connected between the first extension and the second section of the second extension. The at least one first rib and the at least one second rib are located on two sides of the receiving space.

In an example, the at least one first rib includes two first ribs connected between the first extension and the first section. One of the two first ribs is located between the other first rib and the third extension. The at least one second rib includes two second ribs connected between the first extension and the second section. One of the two second ribs is located between the other second rib and the third extension.

In a second aspect, a combination includes a water bottle holder adapter and a water bottle holder. The water bottle holder adapter includes first and second engaging portions respectively located at two opposite ends of the water bottle holder adapter. The first engaging portion is adapted to engage with a bicycle seat. The water bottle holder includes a first extension, a second extension, and a third extension. The first extension is detachably connected to the second engaging portion of the water bottle holder adapter. The third extension extends transversely to the first extension and includes an abutment face. The first extension, the second extension, and the third extension together define a receiving space having an opening opposite to the abutment face. A water bottle is adapted to be placed into the receiving space via the opening and includes a bottom adapted to rest on the abutment face. Each of the first and second extensions includes an end adjacent to the opening. A first spacing between the end of the first extension and the abutment face is smaller than a second spacing between the end of the second extension and the abutment face.

The present invention will become clearer in light of the following detailed description of illustrative embodiments of this invention described in connection with the drawings.

DETAILED DESCRIPTION OF THE INVENTION

Figure 1:
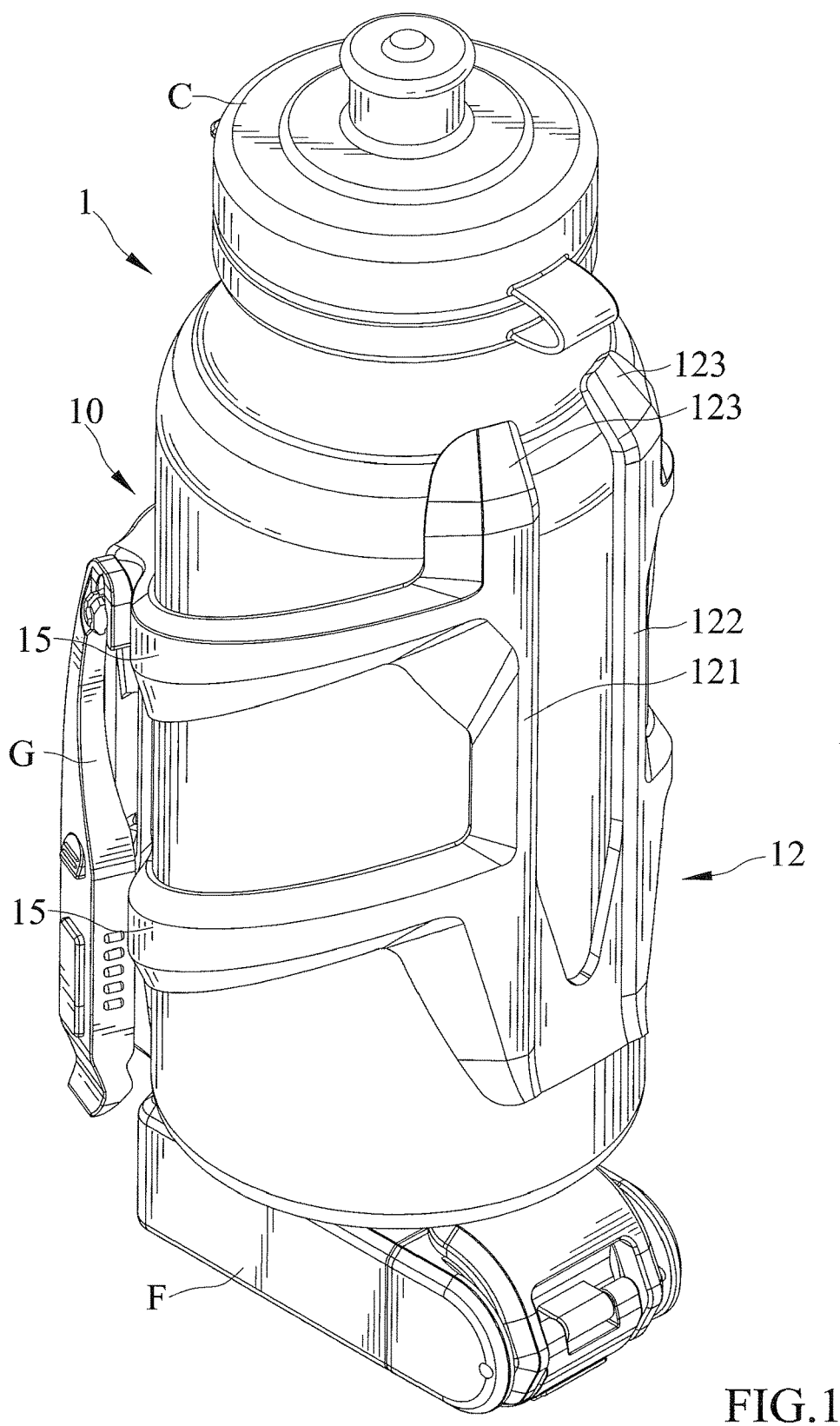
FIG. 1 is a perspective view of a water bottle holder of an embodiment according to the present invention receiving a water bottle.
Figure 2:
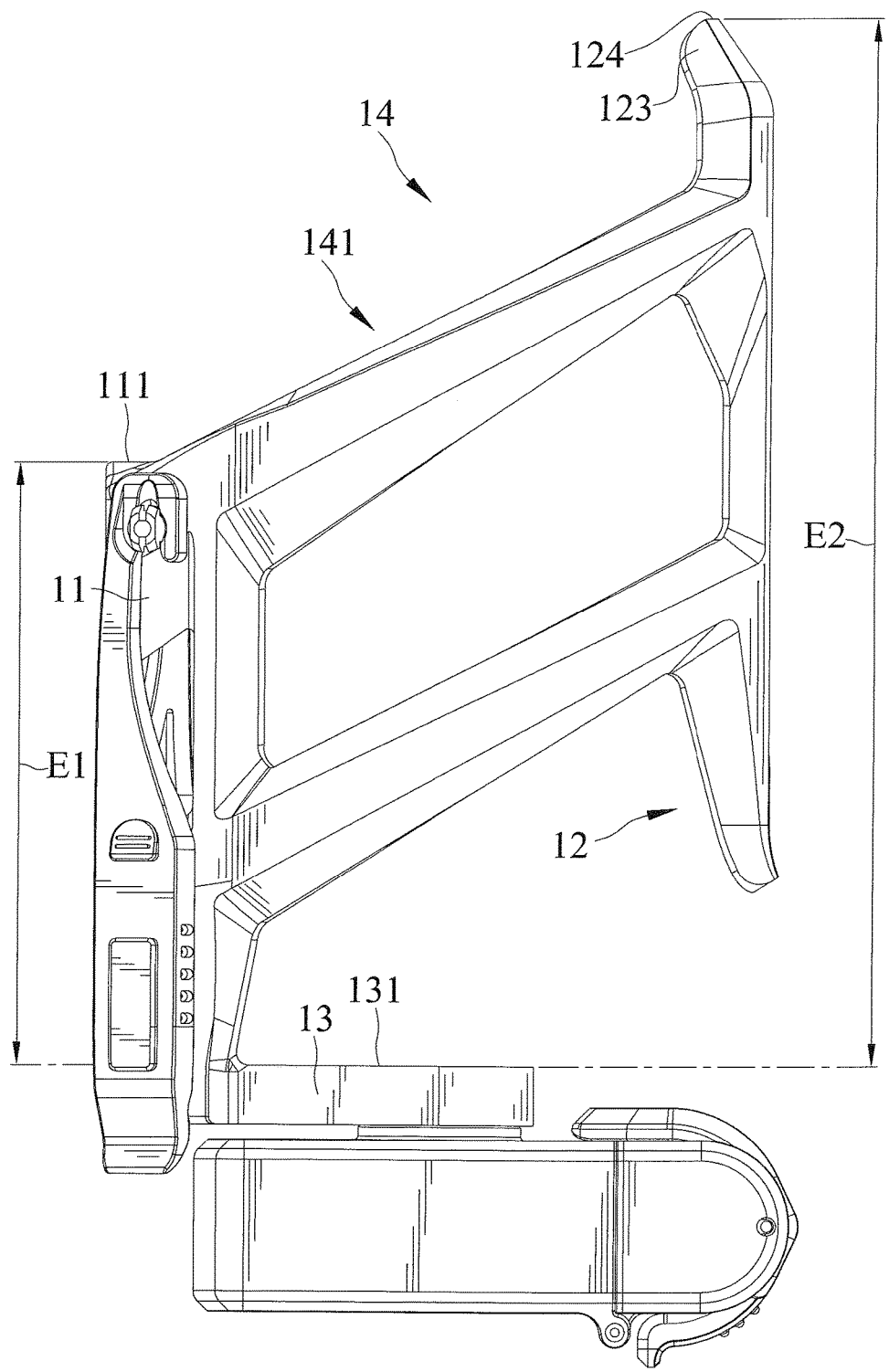
FIG. 2 is a side view of the water bottle holder of FIG. 1.
Figure 3:
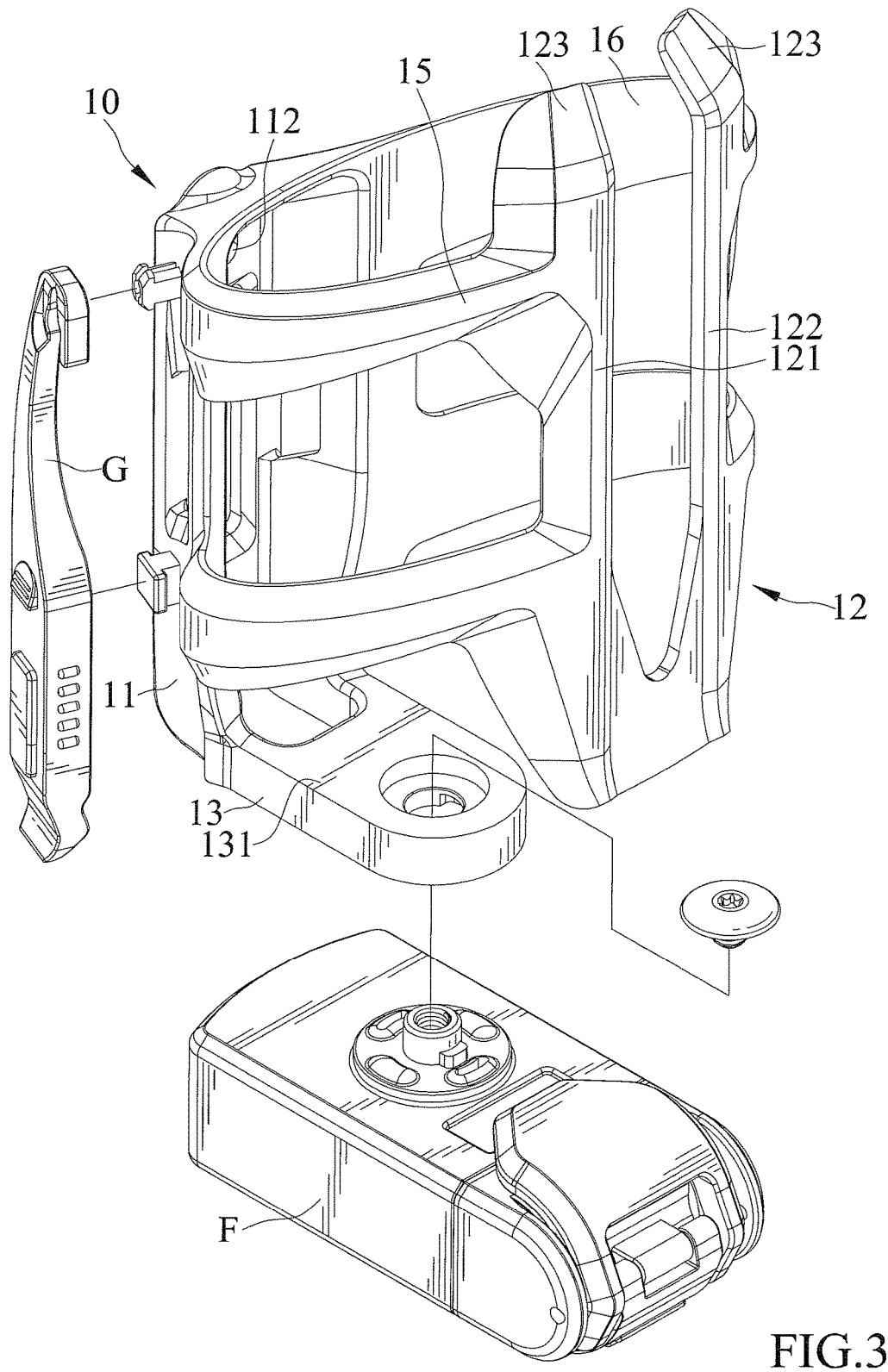
FIG. 3 is an exploded, perspective view of the water bottle holder of FIG. 2.

With reference to FIGS. 1-3, a water bottle holder 1 of an embodiment according to the present invention includes a shelf 10 having a first extension 11, a second extension 12, a third extension 13, at least one first rib 15, and at least one second rib 16. The third extension 13 extends transversely to the first extension 11 and includes an abutment face 131. In this embodiment, the third extension 13 extends perpendicularly to the first extension 11. The at least one first rib 15 is connected between the first extension 11 and the second extension 12. The at least one second rib 16 is connected between the first extension 11 and the second extension 12. The first extension 11, the second extension 12, the third extension 13, the at least one first rib 15, and the at least one second rib 16 together define a receiving space 14 having an opening 141. The at least one first rib 15 and the at least one second rib 16 are located on two sides of the receiving space 14. A water bottle C can be placed in the receiving space 14 via the opening 141. In this embodiment, the water bottle holder 1 further includes a tool box F and at least one tire wrench G. The tool box F is mounted to an end of the third extension 13 opposite to the opening 141 and receives tools for bicycles. The at least one tire wrench G is detachably mounted to the first extension 11 and is located adjacent to a side of the at least one first rib 15 or the at least one second rib 16 facing away from the receiving space 14.

The first extension 11 includes a first top edge 111 and at least one through-hole 112. The first top edge 111 is located on the end of the first extension 11 opposite to the third extension 13 (namely, the first top edge 111 is located adjacent to the opening 141). The at least one through-hole 112 extends through two opposite sides of the first extension 11 and is located between the first top edge 111 and the third extension 13. The at least one through-hole 112 is intercommunicated with the receiving space 14. In this embodiment, the first extension 11 includes two through-holes 112 extending therethrough.

The second extension 12 includes a first section 121, a second section 122, first and second hook sections 123, and two second top edges 124. The first and second sections 121 and 122 are located at two sides of the second extension 12 and are spaced from each other by a spacing. The at least one first rib 15 is connected between the first extension 11 and the first section 121 of the second extension 12. The at least one second rib 16 is connected between the first extension 11 and the second section 122 of the second extension 12. The first hook section 123 is disposed on an end of the first section 121 remote to the abutment face 131. The second hook section 123 is disposed on an end of the second section 122 remote to the abutment face 131. The first top edge 124 is located on an end of the first hook section 123 remote to the first section 12. The second top edge 124 is located on an end of the second hook section 123 remote to the second section 122.

The abutment face 131 is located on the end of the third extension 13 facing the receiving space 14. A bottom of the water bottle C placed into the receiving space 14 via the opening 141 can rest on the abutment face 131.

In this embodiment, the shelf 10 includes two first ribs 15 connected between the first extension 11 and the first section 121. One of the two first ribs 15 is located between the other first rib 15 and the third extension 13. In this embodiment, the shelf 10 includes two second ribs 16 connected between the first extension 11 and the second section 122. One of the two second ribs 16 is located between the other second rib 16 and the third extension 13. The receiving space 14 is defined by the two first ribs 15 and the two second ribs 16.

With reference to FIG. 2, the first top edge 111 is located on the end of the first extension 11 adjacent to the opening 141 and is spaced from the abutment face 131 by a first spacing E1. Each second top edge 124 is located on the end of the second extension 12 adjacent to the opening 141 and is spaced from the abutment face 131 by a second spacing E2 larger than the first spacing E1.

Figure 4:
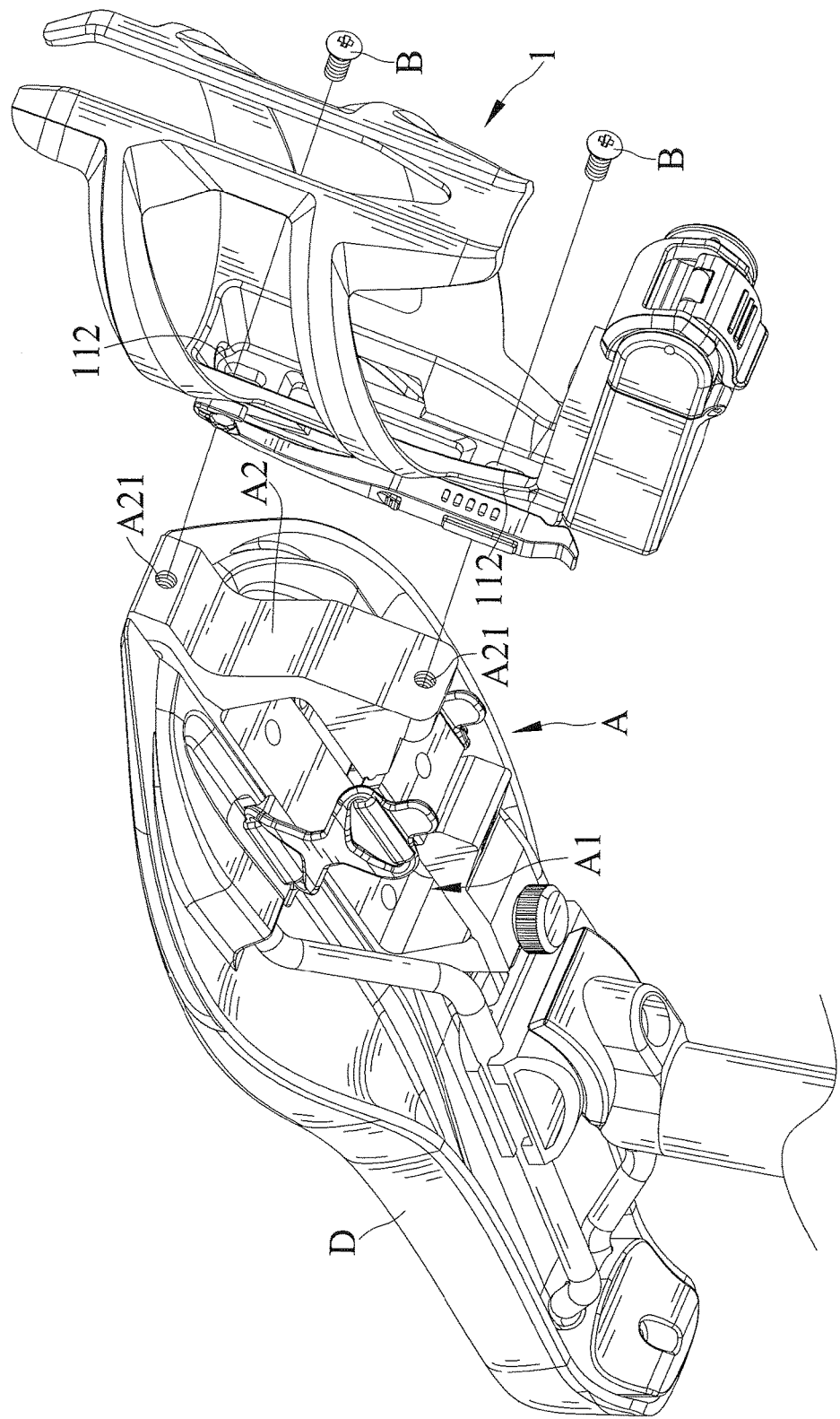
FIG. 4 is a perspective view illustrating coupling of the water bottle holder to a bicycle seat by a water bottle holder adapter of an embodiment according to the present invention.
Figure 5:
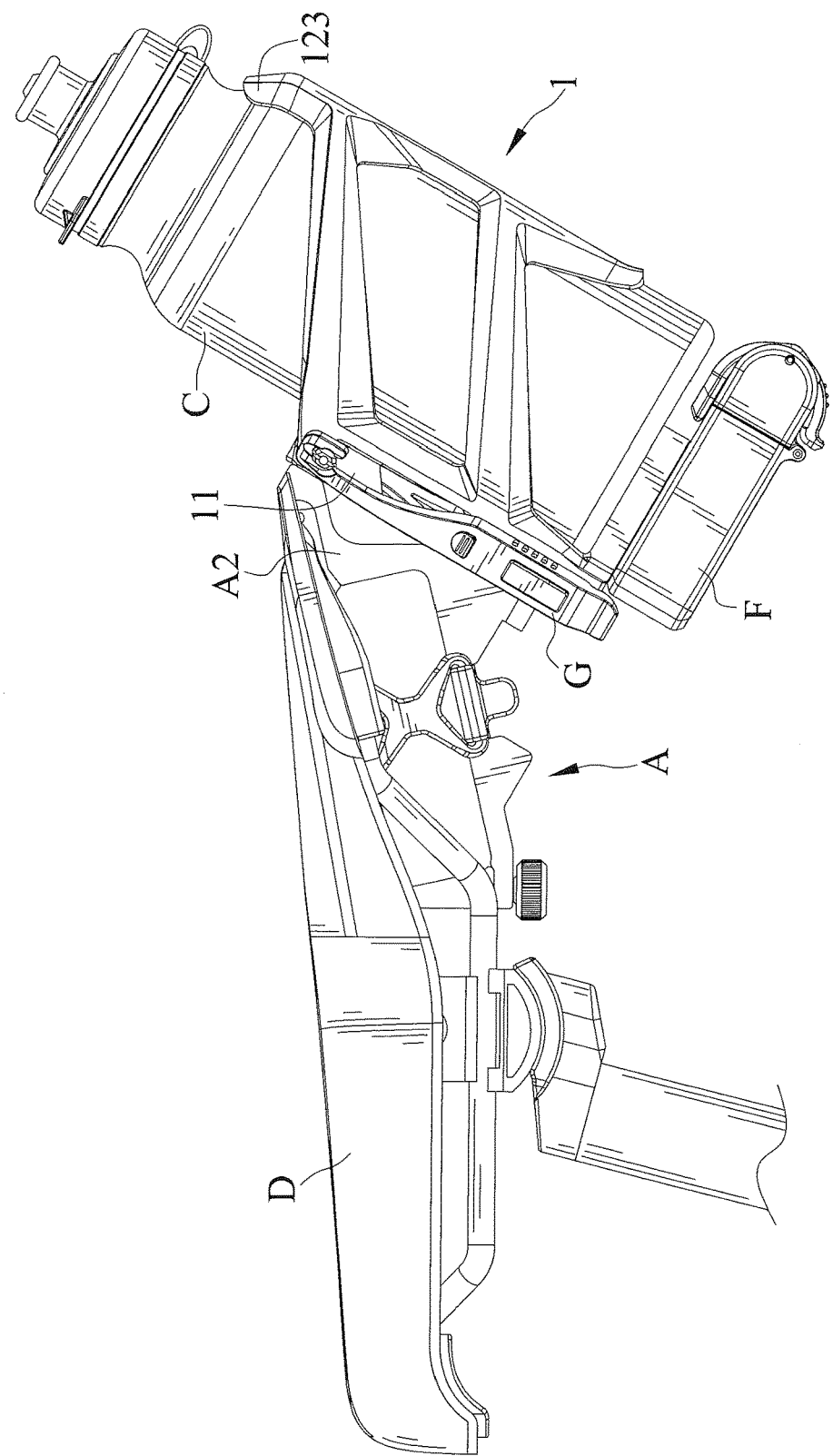
FIG. 5 is a side view of the bicycle seat, the water bottle holder, and the water bottle holder adapter of FIG. 4.

With reference to FIGS. 4 and 5, the water bottle holder 1 can be connected to a water bottle holder adapter A including first and second engaging portions A1 and A2 respectively located at two opposite ends of the water bottle holder adapter A. The first engaging portion A1 is adapted to engage with a bicycle seat D. The first extension 11 is detachably connected to the second engaging portion A2 of the water bottle holder adapter A.

The second engaging portion A2 includes at least one screw hole A21. At least one bolt B extends through the at least one through-hole 112 and is threadedly engaged in the at least one screw hole A21 to connect the first extension 11 of the water bottle holder 1 to the second engaging portion A2. In this embodiment, the second engaging portion A2 includes first and second screw holes A21. The first extension 11 includes first and second through-holes 112. The at least one bolt B includes first and second bolts B. The first bolt B extends through the first through-hole 112 and is threadedly engaged in the first screw hole A21. The second bolt B extends through the second through-hole 112 and is threadedly engaged in the second screw hole A21.

Although the water bottle holder 1 is inclined relative to the bicycle seat D, by arranging the second spacing E2 larger than the first spacing E1, the water bottle C can reliably abut against the second extension 12 and can be retained in place by the hook sections 123. Thus, when a user is riding a bicycle, the water bottle C will not fall out of the receiving space 14 even if the water bottle C is subject to shocks from the bicycle.

Furthermore, since the first extension 11 and the two hook sections 123 of the second extension 12 are on two opposite ends of the water bottle holder 1, since the first extension 11 of the water bottle holder 1 is detachably mounted to the second engaging portion A2 of the water bottle holder adapter A, and since the second spacing E2 is larger than the first spacing E1, when the user riding the bicycle intends to retrieve the water bottle C, the user firstly moves the water bottle C toward the water bottle holder adapter A to disengage from the hook sections 123 and then takes out the water bottle C in a direction toward the user. Thus, the water bottle C can be easily retrieved.

Although specific embodiments have been illustrated and described, numerous modifications and variations are still possible without departing from the scope of the invention. The scope of the invention is limited by the accompanying claims.

The invention claimed is:

1. A water bottle holder comprising:
a shelf including a first extension, a second extension, and a third extension, with the first extension configured to be directly or indirectly coupled to a bicycle seat, with the first extension configured to be intermediate the bicycle seat and the second extension, with the third extension extending transversely to the first extension and including an abutment face, with the first extension, the second extension, and the third extension together defining a receiving space having an opening opposite to the abutment face, with a water bottle adapted to be placed into the receiving space via the opening and including a bottom adapted to rest on the abutment face, with each of the first and second extensions including an end adjacent to the opening, with a first spacing between the end of the first extension and the abutment face being smaller than a second spacing between the end of the second extension and the abutment face, with the first extension including a first top edge on the end of the first extension adjacent to the opening, with the first top edge spaced from the abutment face by the first spacing, with the second extension including at least one second top edge on the end of the second extension adjacent to the opening, with the second top edge spaced from the abutment face by the second spacing, with the second extension being U-shaped and including a first section, a second section, an interconnection between the first and second sections, and first and second hook sections, with the first and second sections located at two sides of the second extension and spaced from each other by a spacing, with the first hook section disposed on an end of the first section remote to the interconnection and the abutment face, with the second hook section disposed on an end of the second section remote to the interconnection and the abutment face, with the at least one second top edge including first and second top edges, with the first top edge located on an end of the first hook section remote to the first section, with the second top edge located on an end of the second hook section remote to the second section, with the shelf including at least one first rib and at least one second rib, with the third extension extending perpendicularly to the first extension towards but spaced from the second extension, with the at least one first rib connected between the first extension and the first section of the second extension, with the at least one second rib connected between the first extension and the second section of the second extension, and with the at least one first rib and the at least one second rib located on two sides of the receiving space.

2. The water bottle holder as claimed in claim 1, with the at least one first rib including two first ribs connected between the first extension and the first section, with one of the two first ribs located between another of the two first ribs and the third extension, with the at least one second rib including two second ribs connected between the first extension and the second section, and with one of the two second ribs located between another of the two second ribs and the third extension.

3. A combination comprising:
  a water bottle holder adapter including first and second engaging portions respectively located at two opposite ends of the water bottle holder adapter, with the first engaging portion adapted to engage with a bicycle seat, with the second engaging portion including at least one screw hole; and
  a water bottle holder including first extension, a second extension, and a third extension, with the first extension detachably connected to the second engaging portion of the water bottle holder adapter, with the third extension extending transversely to the first extension and including an abutment face, with the first extension, the second extension, and the third extension together defining a receiving space having an opening opposite to the abutment face, with a water bottle adapted to be placed into the receiving space via the opening and including a bottom adapted to rest on the abutment face, with each of the first and second extensions including an end adjacent to the opening, and with a first spacing between the end of the first extension and the abutment face being smaller than a second spacing between the end of the second extension and the abutment face, with the first extension including a first top edge and at least one through-hole, with the first top edge located on an end of the first extension adjacent to the opening, with the at least one through-hole extending through two opposite sides of the first extension and located between the first top edge and the abutment face, with at least one bolt extending through the at least one through-hole and threadedly engaged in the at least one screw hole to connect the first extension to the second engaging portion, with the first top edge spaced from the abutment face by the first spacing, with the second extension including at least one second top edge located on an end of the second extension adjacent to the opening, and with the at least one second top edge spaced from the abutment face by the second spacing.

4. The combination as claimed in claim 3, with the at least one screw hole including first and second screw holes, with the at least one through-holes including first and second through-holes, with the at least one bolt including first and second bolts, with the first bolt extending through the first through-hole and threadedly engaged in the first screw hole, and with the second bolt extending through the second through-hole and threadedly engaged in the second screw hole.

* * * * *